(12) United States Patent
Yan

(10) Patent No.: US 11,938,941 B2
(45) Date of Patent: Mar. 26, 2024

(54) MODE SELECTION ACCORDING TO SYSTEM CONDITIONS

(71) Applicants: Denso International America, Inc., Southfield, MI (US); Denso Corporation, Kariya (JP)

(72) Inventor: Yu Yan, Pittsburgh, PA (US)

(73) Assignees: Denso International America, Inc., Southfield, MI (US); DENSO Corporation, Kariya (JP)

( * ) Notice: Subject to any disclaimer, the term of this patent is extended or adjusted under 35 U.S.C. 154(b) by 110 days.

(21) Appl. No.: 17/193,498

(22) Filed: Mar. 5, 2021

(65) Prior Publication Data

US 2022/0063623 A1 Mar. 3, 2022

Related U.S. Application Data

(60) Provisional application No. 62/706,644, filed on Aug. 31, 2020.

(51) Int. Cl.
*B60W 30/182* (2020.01)
*B60W 30/12* (2020.01)
*B60W 40/072* (2012.01)

(52) U.S. Cl.
CPC .......... *B60W 30/182* (2013.01); *B60W 30/12* (2013.01); *B60W 40/072* (2013.01)

(58) Field of Classification Search
CPC .. B60W 30/182; B60W 30/12; B60W 40/072; B60W 2050/0011; B60W 2050/0075; B60W 2552/05; B60W 2552/30
USPC .......................................................... 701/23
See application file for complete search history.

(56) References Cited

U.S. PATENT DOCUMENTS

| | | | |
|---|---|---|---|
| 7,184,590 | B2 | 2/2007 | Lee |
| 8,593,272 | B2 | 11/2013 | Heracles et al. |
| 9,594,378 | B2 | 3/2017 | Laur et al. |
| 9,778,661 | B2 | 10/2017 | Wang et al. |
| 10,347,127 | B2 | 7/2019 | Droz et al. |

(Continued)

FOREIGN PATENT DOCUMENTS

| | | |
|---|---|---|
| CN | 111103882 A | 5/2020 |
| EP | 2749468 B1 | 7/2014 |

(Continued)

OTHER PUBLICATIONS

Ishikawa et al.—JP-2018190045-A—English Translation (Year: 2018).*

*Primary Examiner* — Scott A Reinbold
(74) *Attorney, Agent, or Firm* — Christopher G. Darrow; Darrow Mustafa PC

(57) ABSTRACT

Systems, methods, and other embodiments described herein relate to adaptively selecting a controller for generating vehicle controls. In one embodiment, a method includes, in response to acquiring sensor data about a surrounding environment of the vehicle, determining a driving context of the vehicle in relation to aspects of a roadway on which the vehicle is traveling. The method includes selecting a controller for generating control inputs to the vehicle according to the driving context by selecting between a proportional, integral, derivative (PID) controller and a machine learning (ML) controller. The method includes controlling the vehicle using the controller.

17 Claims, 5 Drawing Sheets

(56) References Cited

U.S. PATENT DOCUMENTS

| | | |
|---|---|---|
| 2017/0277188 A1 | 9/2017 | Xu et al. |
| 2020/0026246 A1 | 1/2020 | Nakagawa |
| 2020/0106861 A1 | 4/2020 | Heiser et al. |
| 2020/0139988 A1 | 5/2020 | Kanekawa et al. |
| 2020/0143670 A1 | 5/2020 | Kitani et al. |
| 2020/0174474 A1 | 6/2020 | Fritzson et al. |
| 2020/0241544 A1 | 7/2020 | Kim et al. |
| 2021/0004006 A1* | 1/2021 | Graves .................. G05D 1/021 |

FOREIGN PATENT DOCUMENTS

| | | | | |
|---|---|---|---|---|
| JP | 2018190045 A | * | 11/2018 | ............ B60R 16/02 |
| JP | 2019131141 A | * | 8/2019 | |
| JP | 2019131141 A | | 8/2019 | |

* cited by examiner

MODE SELECTION ACCORDING TO SYSTEM CONDITIONS

CROSS-REFERENCE TO RELATED APPLICATION

This application claims benefit of U.S. Provisional Application No. 62/706,644, filed on Aug. 31, 2020, which is herein incorporated by reference in its entirety.

TECHNICAL FIELD

The subject matter described herein relates in general to systems and methods for adaptively selecting a controller for generating vehicle controls, and, more particularly, to determining a current driving context to guide the selection of which controller to implement.

BACKGROUND

Controlling a vehicle in different environments can be a complex task. For example, accurately controlling the vehicle balances precision with computational resources. That is, as a general matter, a mobile platform, such as a vehicle, may have limited computational resources due to limitations on a size of a computing device that can be included within the vehicle, available power, and so on. Moreover, higher precision in computations generally may rely on higher resolution sensor inputs (i.e., higher resolution images) and/or additional computational resources, such as more processor time/bandwidth. As an additional consideration, different environments can be more complex to understand and navigate. Thus, in the context of an automated vehicle, a complex environment may mean that computations should be faster and more precise in order to adequately navigate the complexities. However, allocating resources for interpreting a complex scenario may mean that other processes are under-allocated and thus may not function optimally. Moreover, in less complex scenarios, implementing more intensive processing routines may waste energy and computational resources in general. Thus, difficulties with effectively allocating resources can affect the ability of such systems to perform optimally.

SUMMARY

In one embodiment, example systems and methods associated with selectively adapting control of a vehicle according to a driving context are disclosed. As previously noted, different driving conditions, such as highway versus urban, curvy roads versus straight roads, traffic versus no traffic, generally vary in complexity and thus also in the amount of processing that a vehicle may use to navigate the different circumstances. However, when a device, such as a vehicle, implements a single controller and applies that controller to the different driving contexts, then the vehicle either provides controls that are not sufficiently robust for complex scenarios or that are computationally inefficient for less complex scenarios according to the type of controller.

Therefore, in one embodiment, a disclosed approach includes implementing a vehicle with multiple different controllers and actively selecting between the controllers according to a current driving context of the vehicle. For example, in one arrangement, the vehicle includes a proportional, integral, derivative (PID) controller and a machine learning (ML) controller. The PID controller generally operates to efficiently process data quickly, whereas the ML controller provides more accurate determinations in comparison to the PID controller but generally consumes more computational resources. Moreover, the controllers themselves generally produce vehicle controls for automated driving functions (e.g., advanced driving assistance system (ADAS) functions, semi-autonomous functions, and so on).

As such, a control system selects between the PID controller and the ML controller depending on a current driving context. The driving context generally defines a type of environment that the vehicle is currently operating within, such as an urban environment or a highway environment, and may further define aspects associated with the particular roadway, including road curvature, traffic, and so on. The control system can then assess the driving context and select an appropriate controller that is best suited. For example, when the driving context indicates that the vehicle is within an urban environment, then the control system selects the ML controller in order to better handle complex scenarios involving different intersections, traffic patterns, and dynamic objects, such as pedestrians. By contrast, when the driving context indicates highway driving without significant traffic, the control system selects the PID controller in order to conserve resources. In this way, the control system can improve the operation of the vehicle by dynamically adapting control for different driving contexts.

In one embodiment, a control system is disclosed. The control system includes one or more processors and a memory that is communicably coupled to the one or more processors. The memory stores a selection module including instructions that, when executed by the one or more processors, cause the one or more processors to, in response to acquiring sensor data about a surrounding environment of the vehicle, determine a driving context of the vehicle in relation to aspects of a roadway on which the vehicle is traveling. The selection module includes instructions to select a controller for generating control inputs to the vehicle according to the driving context by selecting between a proportional, integral, derivative (PID) controller and a machine learning (ML) controller. The selection module includes instructions to control the vehicle using the controller.

In one embodiment, a non-transitory computer-readable medium is disclosed. The computer-readable medium stores instructions that, when executed by one or more processors, cause the one or more processors to perform the disclosed functions. The instructions include instructions to, in response to acquiring sensor data about a surrounding environment of the vehicle, determine a driving context of the vehicle in relation to aspects of a roadway on which the vehicle is traveling. The instructions include instructions to select a controller for generating control inputs to the vehicle according to the driving context by selecting between a proportional, integral, derivative (PID) controller and a machine learning (ML) controller. The instructions include instructions to control the vehicle using the controller.

In one embodiment, a method is disclosed. In one embodiment, a method includes, in response to acquiring sensor data about a surrounding environment of the vehicle, determining a driving context of the vehicle in relation to aspects of a roadway on which the vehicle is traveling. The method includes selecting a controller for generating control inputs to the vehicle according to the driving context by selecting between a proportional, integral, derivative (PID) controller and a machine learning (ML) controller. The method includes controlling the vehicle using the controller.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
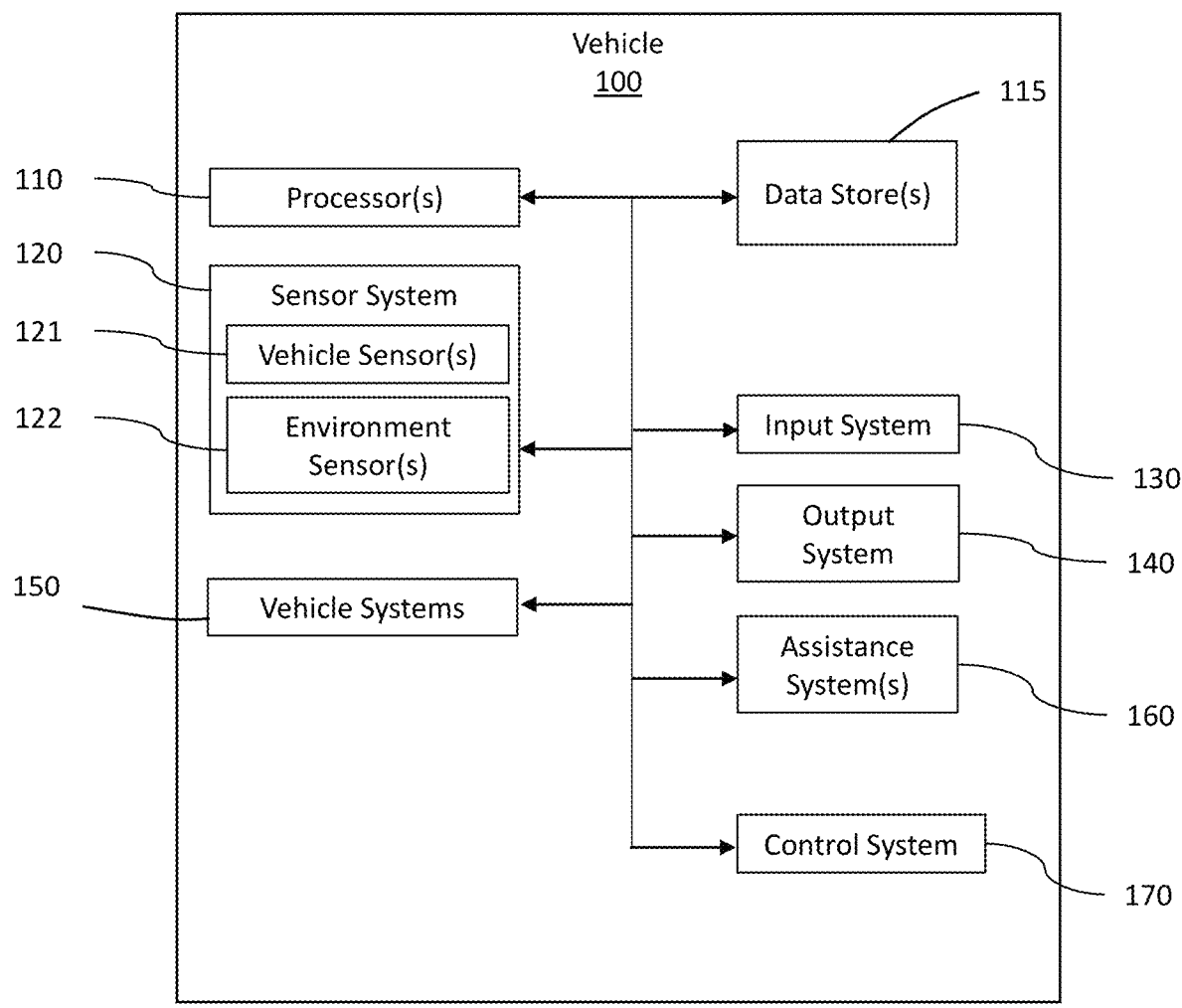
FIG. 1 illustrates one embodiment of a configuration of a vehicle in which example systems and methods disclosed herein may operate.

Systems, methods, and other embodiments associated with selectively adapting control of a vehicle according to a driving context are disclosed. As previously noted, different driving conditions, such as highway versus urban, generally vary in complexity and thus also in the amount of processing that a vehicle may use to navigate the different circumstances. That is, for example, with complex scenarios like those of urban environments, there can be many different objects to identify and track, lane configurations to identify, traffic signs/signals to identify, and so on. All of these additional elements add to the complexity of processing information about the environment and deriving determinations to facilitate navigation. Accordingly, more complex approaches, such as machine learning controllers, can generally improve determinations in these scenarios but use more computational resources. Thus, when a device, such as a vehicle, implements a single controller and applies that controller to the different driving contexts, then the vehicle either provides controls that are not sufficiently robust for complex scenarios or that are computationally inefficient for less complex scenarios according to the type of controller.

Therefore, in one embodiment, a disclosed approach includes implementing a vehicle with multiple different controllers and actively selecting between the controllers according to a current driving context of the vehicle. For example, in one arrangement, the vehicle includes a proportional, integral, derivative (PID) controller and a machine learning (ML) controller. The PID controller generally operates to efficiently process data quickly, whereas the ML controller provides more accurate determinations in comparison to the PID controller but generally consumes more computational resources. Moreover, the controllers themselves generally produce vehicle controls for automated driving functions (e.g., advanced driving assistance system (ADAS) functions, semi-autonomous functions, and so on).

As such, a control system selects between the PID controller and the ML controller depending on a current driving context. The driving context generally defines a type of environment that the vehicle is currently operating within, such as an urban environment or a highway environment, and may further define aspects associated with the particular roadway, including road curvature, traffic, and so on. The control system can then assess the driving context and select an appropriate controller that is best suited. For example, when the driving context indicates that the vehicle is within an urban environment, then the control system selects the ML controller in order to better handle complex scenarios involving different intersections, traffic patterns, and dynamic objects, such as pedestrians. By contrast, when the driving context indicates highway driving without significant traffic, the control system selects the PID controller in order to conserve resources. In this way, the control system can improve the operation of the vehicle by dynamically adapting control for different driving contexts.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of transport that, for example, includes two or more controllers and thus benefits from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a control system 170 that functions to improve the selection of a controller according to a driving context. While depicted as a stand-alone component, in one or more configurations, the control system 170 is integrated with the assistance system 160, or another similar system of the vehicle 100 to facilitate functions of the other systems/modules. The noted functions and methods will become more apparent with a further discussion of the figures.

Furthermore, the assistance system 160 may take many different forms but generally provides some form of automated assistance to an operator of the vehicle 100. For example, the assistance system 160 may include various advanced driving assistance system (ADAS) functions, such as a lane-keeping function, adaptive cruise control, collision avoidance, emergency braking, and so on. In further aspects, the assistance system 160 may be a semi-autonomous or fully autonomous system that can partially or fully control the vehicle 100. Accordingly, the assistance system 160, in whichever form, functions in cooperation with sensors of the sensor system 120 to acquire observations about the surrounding environment from which additional determinations can be derived in order to provide the various functions, which generally includes controls for steering, braking, and accelerating the vehicle 100. Thus, the assistance system 160 includes multiple different controllers for generating the control inputs to the vehicle 100. The different controllers generally have different characteristics, such as different inputs (e.g., different sensor inputs), different computational requirements, and so on.

In the present discussion, the assistance system 160 is discussed as including two controllers, a PID controller and an ML controller. The PID controller (also referred to as a three-term controller) is a control loop mechanism that is a continuously modulated control. Broadly speaking, the PID controller measures the error between a desired setpoint and a measured process variable (e.g., a realized value of the setpoint) and applies a correction that is a function of, for example, proportional, integral, and derivative terms. The ML controller functions by processing various inputs, such as fused sensor data, maps, dynamics, etc. using one or more machine learning algorithms, such as a deep neural network (DNN). In either case, the controllers output vehicle controls for controlling the vehicle 100 laterally and/or longitudinally.

Figure 2:
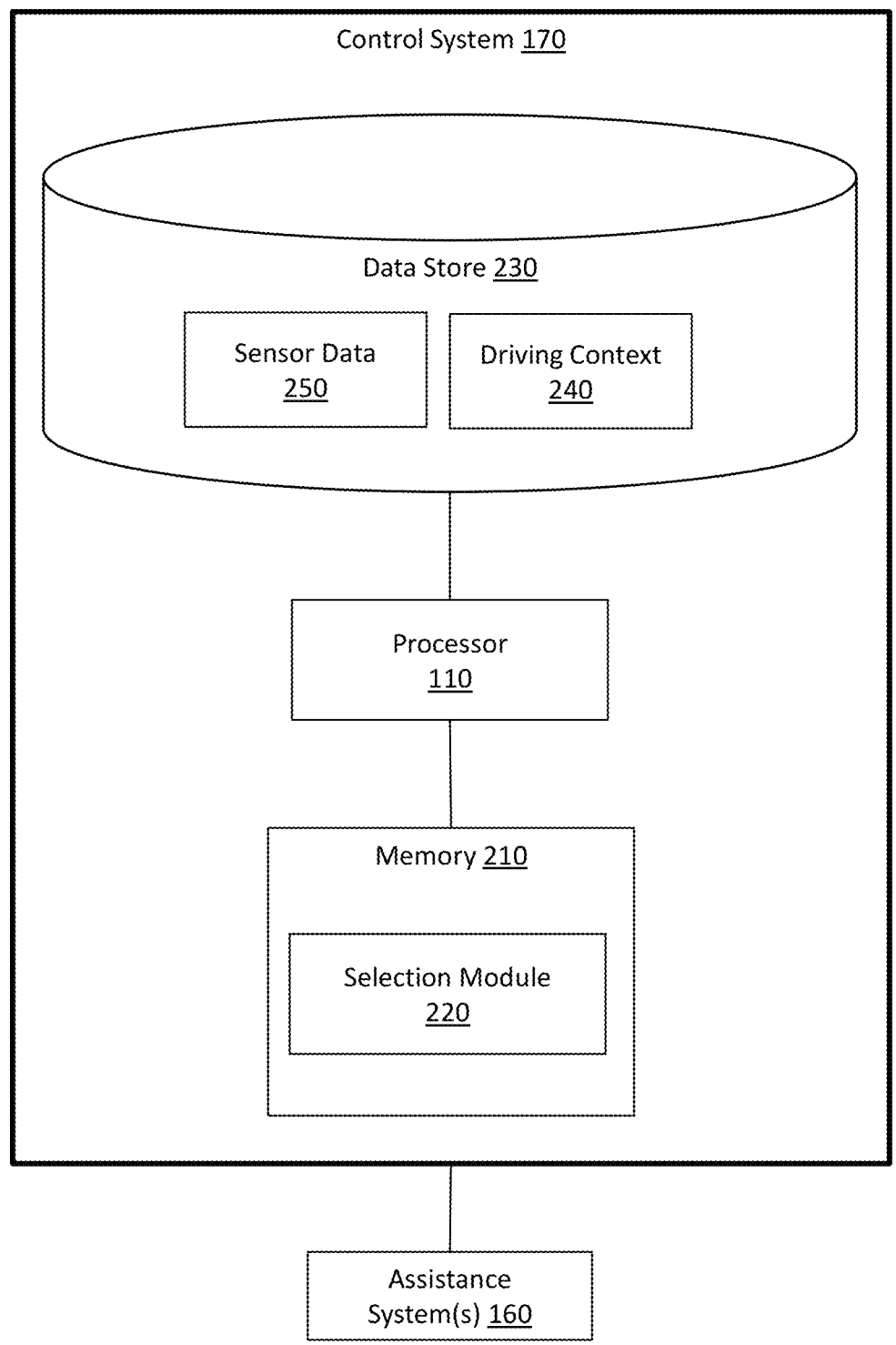
FIG. 2 illustrates one embodiment of a control system that is associated with adaptively selecting a controller.

With reference to FIG. 2, one embodiment of the control system 170 is further illustrated. As shown, the control system 170 includes a processor 110. Accordingly, the processor 110 may be a part of the control system 170, or the control system 170 may access the processor 110 through a data bus or another communication pathway. In one or more embodiments, the processor 110 is an application-specific integrated circuit that is configured to implement functions associated with a selection module 220. More generally, in one or more aspects, the processor 110 is an electronic processor, such as a microprocessor that is capable of performing various functions as described herein when executing encoded functions associated with the control system 170.

In one embodiment, the control system 170 includes a memory 210 that stores the selection module 220. The memory 210 is a random-access memory (RAM), read-only memory (ROM), a hard disk drive, a flash memory, or other suitable memory for storing the module 220. The module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware, such as processing components (e.g., controllers), circuits, etc. for independently performing one or more of the noted functions.

Furthermore, in one embodiment, the control system 170 includes a data store 230. The data store 230 is, in one embodiment, an electronically-based data structure for storing information. For example, in one approach, the data store 230 is a database that is stored in the memory 210 or another suitable medium, and that is configured with routines that can be executed by the processor 110 for analyzing stored data, providing stored data, organizing stored data, and so on. In any case, in one embodiment, the data store 230 stores data used by the module 220 in executing various functions. In one embodiment, the data store 230 includes sensor data 250, and driving context 240 along with, for example, other information that is used by the module 220.

Accordingly, the selection module 220 generally includes instructions that function to control the processor 110 to acquire data inputs from one or more sensors of the vehicle 100 that form the sensor data 250. In general, the sensor data 250 includes information that embodies observations of the surrounding environment of the vehicle 100. The observations of the surrounding environment, in various embodiments, can include surrounding lanes, vehicles, objects, obstacles, etc. that may be present in the lanes, proximate to a roadway, within a parking lot, garage structure, driveway, or another area within which the vehicle 100 is traveling or parked.

While the selection module 220 is discussed as controlling the various sensors to provide the sensor data 250, in one or more embodiments, the selection module 220 can employ other techniques to acquire the sensor data 250 that are either active or passive. For example, the selection module 220 may passively sniff the sensor data 250 from a stream of electronic information provided by the various sensors to further components within the vehicle 100. Moreover, the selection module 220 can undertake various approaches to fuse data from multiple sensors when providing the sensor data 250. Thus, the sensor data 250, in one embodiment, represents a combination of perceptions acquired from multiple sensors and/or other aspects of the vehicle 100. For example, in a further configuration, the sensor data 250 may include information acquired via a communication system, such as data from other vehicles and/or infrastructure devices about the surroundings of the vehicle 100.

Thus, whether the sensor data 250 is derived from a single sensor, multiple sensors, or is acquired through other means, the sensor data 250 is comprised of various information that facilitates the selection module 220 with determining the driving context 240. In general, the driving context 240 indicates a current operating environment of the vehicle 100 in which the assistance system 160 is providing at least partial control of the vehicle 100. For example, the driving context 240 may specify whether the vehicle 100 is driving on a highway or within an urban area. The driving context 240 may further indicate an extent of curvature of a roadway, an amount of traffic that is proximate to the vehicle 100, and so on. Moreover, in a further aspect, the driving context 240 also includes information about current functions of the assistance system 160 that are operating. For example, the driving context 240 may specify whether a lane-keeping function is operational, whether a particular type of maneuver is planned for a semi-autonomous or fully-autonomous mode, and so on.

In at least one arrangement, the selection module 220 analyzes the sensor data 250 to determine the driving context 240. Thus, the selection module 220 may use a policy or a context determination heuristic to analyze the sensor data 250 and determine the driving context 240 therefrom. By way of example, in at least configuration, the selection module 220 can determine location context (e.g., urban versus highway) by comparing a location on a map, by identifying specific characteristics of the surrounding environment, such as the presence of highway signs vs. traffic signals, by identifying the presence of pedestrians, and so on. It should be appreciated that the driving context can identify many different aspects about the surrounding environment and the current operational context of the vehicle 100. Thus, the discussed aspects are provided as examples and it should be appreciated that the scope of the driving context can extend beyond the noted examples.

In any case, the selection module 220 may further analyze traffic data and further information about surrounding objects to determine a current density of objects proximate to the vehicle 100. Further, in at least one arrangement, the selection module 220 analyzes images and/or other aspects of the sensor data 250 to determine an extent of curvature in the road on which the vehicle 100 is traveling. Of course, while analysis of images is mentioned, the selection module 220 may instead analyze map data, steering inputs, progressions of lane lines, and so on to determine the curvature.

As still a further aspect, the selection module 220 analyzes aspects of the sensor data 250 from internal state buffers of the vehicle 100 that indicate, for example, current operating conditions of the vehicle 100, such as whether sensors are functioning properly, whether certain functions of the assistance system 160 are active, and so on. In this way, the selection module 220 acquires awareness about the surroundings of the vehicle 100 and how the vehicle 100 is presently operating in the surroundings.

Accordingly, the selection module 220 can then use the driving context 240 to determine which of the controllers to activate. In at least one approach, the process of selecting the controller is a multi-step process that may involve comparisons against various thresholds to make determinations about which of the controllers is appropriate for the driving context. Thus, in one aspect, the selection module 220 initially determines whether the driving context specifies that the vehicle 100 is operating on a highway or within an urban area. As previously noted, the driving context may specify the particular area according to indications about the presence of various characteristics (e.g., traffic signals, etc.), and/or by direct comparison of a current location with a map specifying the different regions.

In the instance where the selection module 220 identifies that the vehicle 100 is within an urban area, the selection module 220 selects the ML controller to generate the controls since this type of environment is generally more complex to navigate. However, in the instance of a highway or a rural area, the selection module 220 may undertake a more nuanced approach to determine the appropriate controller. For example, when the selection module 220 identifies that the vehicle 100 is driving on a highway or similar area, additional determinations may be undertaken. In one arrangement, the selection module 220 further determines the curvature of the roadway. For example, the selection module 220 may use the lane lines to assess the curvature and compare the identified curvature to a curve threshold in order to determine whether the ML controller or the PID controller should be implemented. In instances where the identified curvature satisfies the curve threshold (e.g., equals or exceeds), indicating that the road is curvy, then the selection module 220 causes the ML controller to generate the controls.

In yet a further determination, the selection module 220 determines whether the lane-keeping function is in use without any other assistance functions. If so, then the selection module 220 can default to using the PID controller. However, if the lane-keeping function is not the sole function in use because of, for example, a lane change maneuver that is taking place or another function that is operating, then the selection module 220 may further determine whether traffic around the vehicle 100 satisfies a lane threshold. The lane threshold indicates a critical mass of traffic. In one example, the lane threshold defines a number (e.g., 2 or more) of vehicles that may be within a defined distance of the vehicle 100 (e.g., within 10 meters). Accordingly, when the traffic satisfies the lane threshold, then the selection module 220 selects the ML controller. Otherwise, the selection module 220 defaults to selecting the PID controller.

The PID controller and the ML controller both function to generate control inputs for controlling the vehicle 100 laterally (i.e., steering) and/or longitudinally (i.e., accelerating/braking), which is undertaken according to a particular function(s) of the assistance system 160 that is active. Accordingly, once the selection module 220 selects the controller, the selection module 220 can then cause the assistance system 160 to use the particular controller and provide control inputs to the vehicle 100 according to the controller. In this way, the control system 170 dynamically adapts the controller that is in use while the vehicle 100 travels along a route in order to ensure that the controller can efficiently and accurately handle the driving context.

Figure 3:
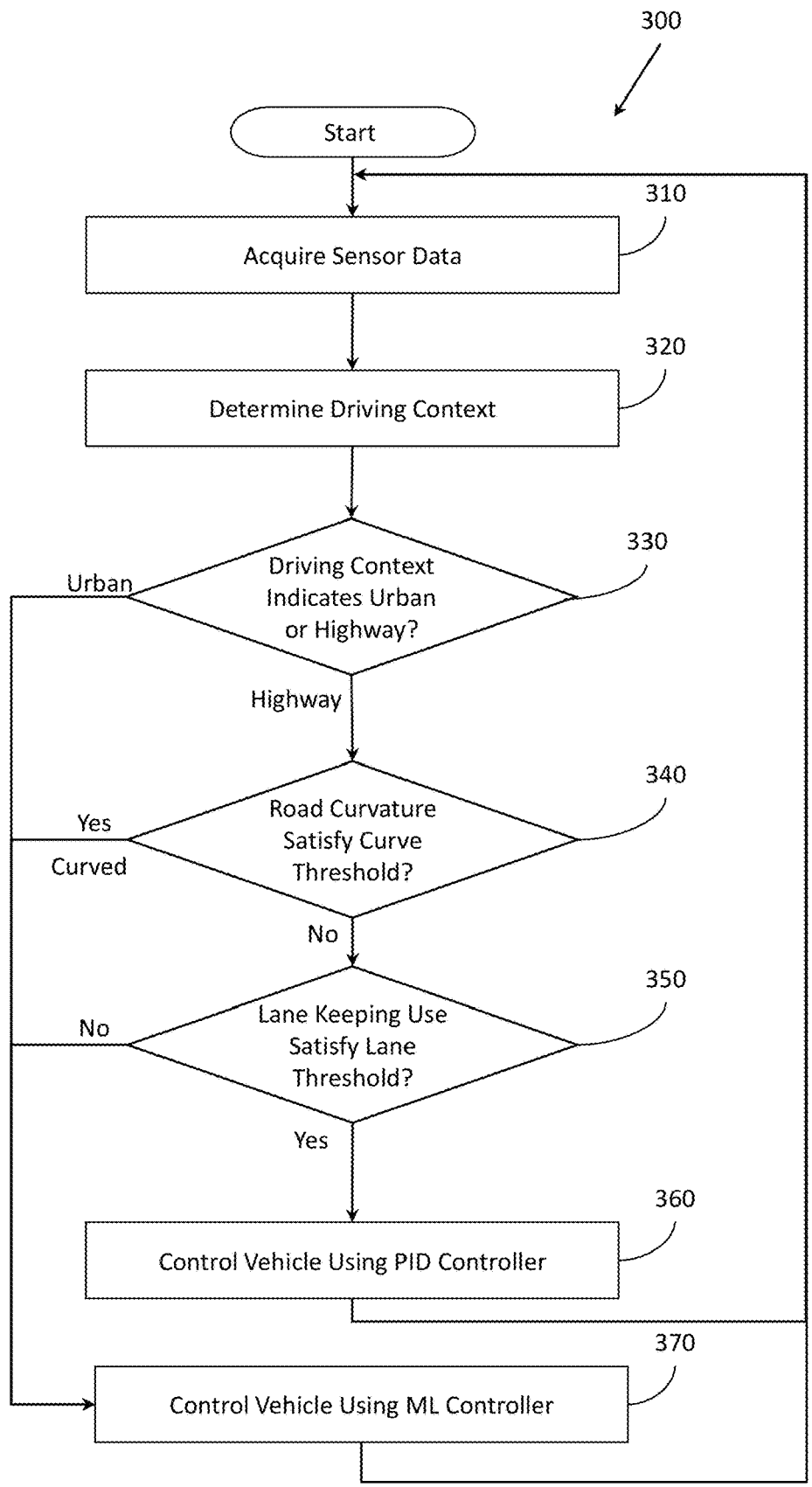
FIG. 3 illustrates one embodiment of a method associated with determining a driving context in order to select a controller.

Additional aspects of dynamically selecting between multiple different controllers will be discussed in relation to FIG. 3. FIG. 3 illustrates a method 300 associated with selecting a controller for generating vehicle inputs. Method 300 will be discussed from the perspective of the control system 170 of FIG. 1. While method 300 is discussed in combination with the control system 170, it should be appreciated that the method 300 is not limited to being implemented within the control system 170 but is instead one example of a system that may implement the method 300.

At 310, the selection module 220 acquires the sensor data 250. In one embodiment, acquiring the sensor data 250 includes controlling one or more sensors of the vehicle 100 to generate observations about the surrounding environment of the vehicle 100. In one embodiment, the selection module 220 acquires the sensor data 250 about the surrounding environment of the vehicle 100 but may also acquire information about the vehicle 100 itself, such as IMU data, wheel slip data, state information associated with the assistance system 160 (e.g., identifying currently operating functions), and so on. The selection module 220, in one or more implementations, iteratively acquires the sensor data 250 from one or more sensors of the sensor system 120. The sensor data 250 includes observations of a surrounding environment of the subject vehicle 100, including specific regions that are relevant to functions executed by systems of the vehicle 100, such as assistance system 160 (e.g., activation zones, scanning zones, etc.), and so on.

At 320, the selection module 220 determines the driving context 240. The driving context generally defines, in at least one approach, characteristics about the surrounding environment of the vehicle 100. For example, in one approach, the driving context defines characteristics about a type of driving environment, such as highway or urban. In regard to the characteristics, the control system 170 determines this aspect since an urban driving environment is generally more complex to navigate. That is, an urban environment often includes more dynamic agents moving at different trajectories than the vehicle 100 and also includes more complex traffic patterns. For example, a single intersection may include vehicles moving across a path of the vehicle 100, in an opposing direction, and turning through the path of the vehicle 100, while other agents, such as pedestrians, may also interact with the vehicle 100. Furthermore, an urban environment includes different types of traffic signals/signs, and many different obstructions and obstacles.

By contrast, a highway context is generally limited to other vehicles moving in a same direction as the ego vehicle 100 with limited additional hazards and no traffic signals/signs other than those indicating exits. Accordingly, the difference in complexity between highway driving and urban driving generally results in the use of additional computational resources in order to understand and effectively navigate the urban environment. Thus, the selection module 220, in one approach, extracts information about the surrounding environment from the sensor data 250 so that the control system 170 can distinguish between urban and highway contexts, and/or other aspects of the environment, including road curvature, the presence of traffic, and so on.

To derive this information from the sensor data 250, the selection module 220 may implement various techniques including a set of machine learning algorithms. The ML algorithms may vary but can include at least image recognition algorithms, such as convolutional neural networks (CNNs) or similar networks that can segment and classify aspects of the surrounding environment. In further approaches, the machine learning algorithms may include semantic segmentation algorithms, depth completion algorithms, clustering algorithms, and so on. In general, the machine learning algorithms are deriving information that is useful in identifying aspects of the environment so that characteristics can be imbued therefrom.

Regarding highway/urban determinations, the selection module 220, in one arrangement, analyzes the sensor data 250 to identify context characteristics of the surrounding environment that correspond with highway and urban environments. The context characteristics include aspects, such as pedestrians, highway signs, traffic signals, traffic signs, lane markers, trajectories of nearby objects, surrounding structures, etc. Thus, the sensor module 220 populates the driving context with the context characteristics as determined according to the analysis of the sensor data 250. In this way, the sensor module 220 can subsequently make determinations about how to select the controller.

At 330, the selection module 220 begins a process of multiple determinations to select a controller for generating control inputs to the vehicle according to the driving context 240. Accordingly, the selection module 220 further analyzes the driving context 240 to identify whether the vehicle 100 is driving in an urban area or on a highway. If the selection module 220 determines that the vehicle 100 is within an urban environment, then the selection module 220 proceeds to select the ML controller at 370. Otherwise, the selection module 220 continues with further determinations when the driving context 240 indicates a highway environment.

At 340, the selection module 220 determines whether the driving context 240 indicates that the vehicle 100 is driving on a highway with a road curvature that satisfies a curve threshold (e.g., substantially straight vs curvy). In general, the curve threshold defines an amount of curviness in the road that induces a need for further accuracy in the controls. Moreover, at 340, the selection module 220 has previously determined that the vehicle 100 is operating on a highway, as noted at 330. As such, the selection module 220 can simply determine whether the road curvature satisfies the curve threshold. When the selection module 220 determines that the road is, in fact, curvy according to a comparison with the curve threshold, then the selection module 220 proceeds to select the ML controller at 370. Otherwise, the selection module 220 proceeds with further determinations about the lane-keeping function and traffic density.

At 350, the selection module 220 determines whether the driving context 240 indicates that the vehicle 100 is driving on a highway with a lane-keeping function operating. That is, in one arrangement, the selection module 220 determines whether the assistance system 160 satisfies a lane threshold. The lane threshold may include multiple parts, such as identifying whether the assistance system 160 is operating with only the lane-keeping function, and, if so, then the selection module 220 proceeds to select the PID controller at 360. However, if not, then the selection module 220 may undertake a further determination in a second part of the lane threshold. The second part involves the current density of traffic around the vehicle 100. The lane threshold may specify a number of vehicles within a defined proximity to the vehicle 100 that are acceptable (e.g., less than 2). Accordingly, when the traffic does not satisfy the lane threshold (e.g., few vehicles are proximate to the vehicle 100), then the selection module 220 selects the PID controller at 360. However, when the traffic does satisfy the lane threshold, then the selection module 220 determines that the driving scenario is complex and is beyond what should be handled by the PID controller. Accordingly, the selection module 220 selects the ML controller at 370 instead.

At 360, the selection module 220 causes the assistance system 160 to use the PID controller to generate controls for the vehicle 100. As noted previously, the PID controller is a control loop mechanism that processes the sensor data 250 to generate controls.

At 370, the selection module 220 controls the vehicle 100 by causing the assistance system 160 to use the ML controller to generate controls for the vehicle 100. As noted, the ML controller implements one or more machine learning algorithms that process the sensor data 250 to generate the controls. In this way, the control system 170 can adapt how lateral and longitudinal controls for the vehicle 100 are produced by the assistance system 160 in order to customize an approach to different driving contexts.

Figure 4A:
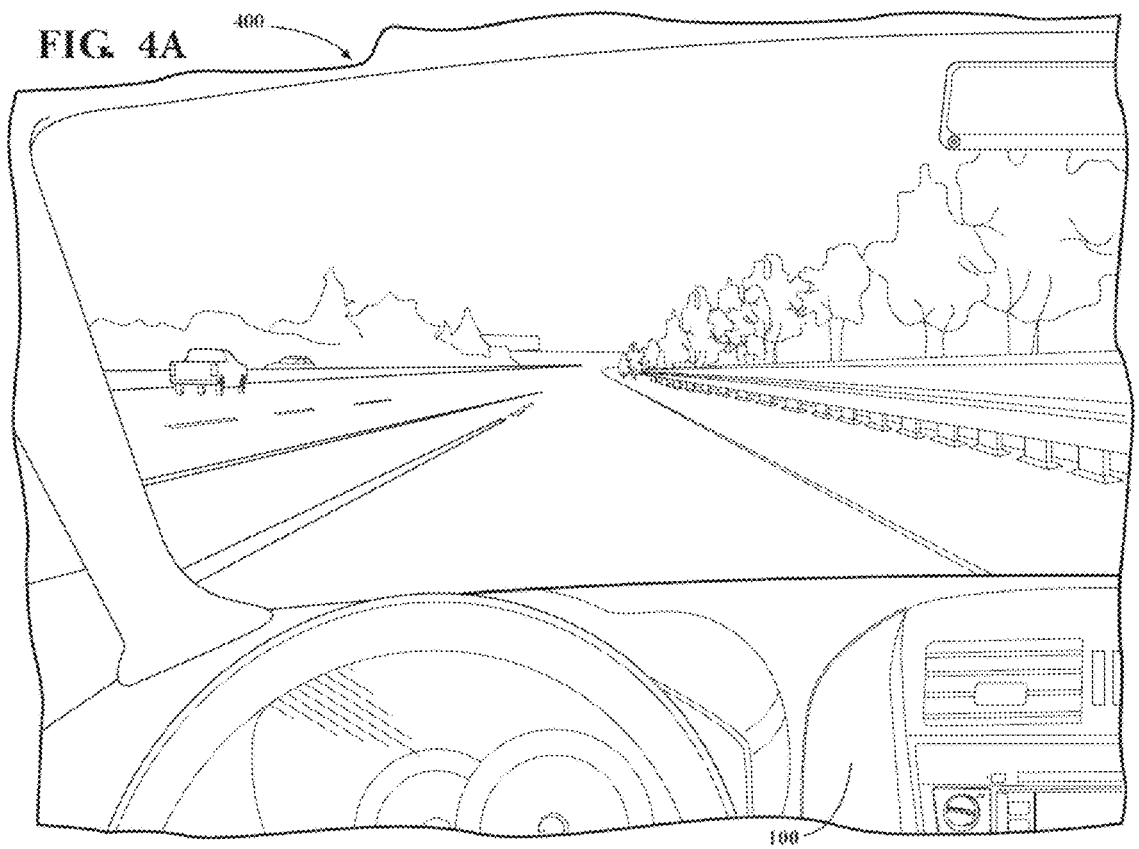
FIGS. 4A-B illustrates examples of different driving contexts.
Figure 4B:
Figure 5:
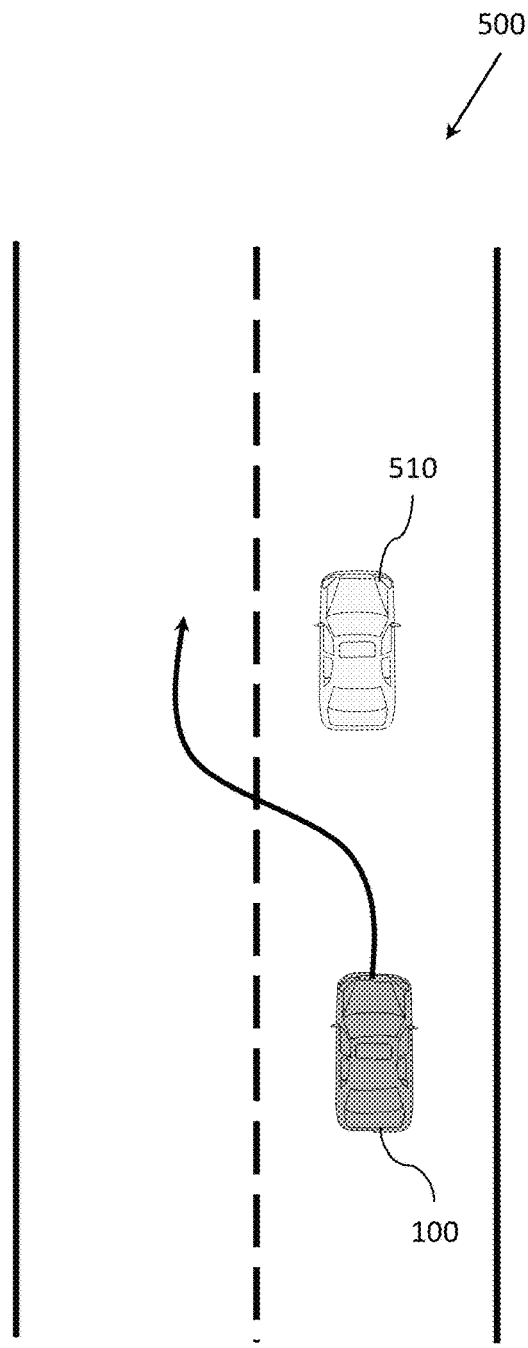
FIG. 5 illustrates a further example of a driving context.

As a further explanation of how the presently disclosed systems and methods function, consider FIGS. 4-5. FIGS. 4A and 4B illustrate separate driving scenes 400 and 410, respectively. As shown in FIG. 4A, the control system 170 may identify the driving context as a highway context. That is, the scene 400 generally depicts a set of parallel lanes with a single vehicle traveling in the same direction as the vehicle 100. Thus, there are no indicators of an urban context, such as traffic signals, pedestrians, and so on, but instead are indicators of a simple highway context. In this case, the control system 170 selects the PID controller since there are also few additional vehicles and little to no curvature of the road.

As shown in FIG. 4B, the control system 170 identifies pedestrians, buildings, and a surface street with just a single lane, which are elements that correspond with an urban context. Thus, there are no indicators associated with a highway, and according to the identified components, the control system 170 indicates that the scene 410 is associated with an urban environment. In this case, the control system 170 indicates that the driving context is urban and proceeds to select the ML controller to provide controls. In this way, the control system 170 improves navigation by the assistance system 160 through the environment by using a controller that is better suited for the driving context 240.

As a further example of how the control system 170 functions, consider FIG. 5, which illustrates one example of a highway context. As shown in FIG. 5, a roadway 500 includes two lanes and a vehicle 510 ahead of the vehicle 100. Thus, initially, the scenario illustrated in FIG. 5 results in the control system 170 using the PID controller because of the highway context, the lack of curvature, and the low density of traffic. However, once the vehicle 100 makes the determination to maneuver around the vehicle 510, as shown, the control system 170 switches to the ML controller since the lane-keeping function is no longer functioning in isolation, but other functions are also active to generate the maneuver. In this way, the control system 170 adapts the controller on-the-fly to improve accuracy and efficiency.

Additionally, it should be appreciated that the control system 170 from FIG. 1 can be configured in various arrangements with separate integrated circuits and/or electronic chips. In such embodiments, the selection module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the control system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the control system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the control system 170, and/or the assistance system 160 may control some or all of these vehicle systems 150 and, thus, may be partially or fully autonomous.

The processor(s) 110, the control system 170, and/or the assistance system 160 can be operatively connected to communicate with the various vehicle systems 150 and/or individual components thereof. For example, returning to FIG. 1, the processor(s) 110, the control system 170, and/or the assistance system 160 can be in communication to send and/or receive information from the various vehicle systems 150 to control the movement, speed, maneuvering, heading, direction, etc. of the vehicle 100. The processor(s) 110, the control system 170, and/or the assistance system 160 may control some or all of these vehicle systems 150.

The processor(s) 110, the control system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the control system 170, and/or the assistance system 160 can control the direction and/or speed of the vehicle 100. The processor(s) 110, the control system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the control system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160 either independently or in combination with the control system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A control system, comprising:
one or more processors; and
a memory communicably coupled to the one or more processors and storing:
a selection module including instructions that, when executed by the one or more processors cause the one or more processors to:
in response to acquiring sensor data about a surrounding environment of a vehicle, determine a driving context of the vehicle in relation to aspects of a roadway on which the vehicle is traveling, wherein the driving context includes indicators about whether the vehicle is driving on a highway, in an urban area, on a road with a curvature that satisfies a curve threshold, and whether a lane keeping function of the vehicle is active;
select an active controller for generating control inputs to the vehicle according to the driving context by selecting between a proportional, integral, derivative (PID) controller and a machine learning (ML) controller,
wherein the selection module includes instructions to select the active controller including instructions to determine whether the driving context indicates that the vehicle is driving on a highway and with a lane-keeping function active that satisfies a lane threshold, the lane threshold indicating whether two or more nearby vehicles are present and whether other assistance systems of the vehicle are not operating, and wherein the selection module includes instructions to select the ML controller when the driving context indicates the lane-keeping function satisfies the lane threshold for a complex driving scenario; and
control the vehicle using the active controller.

2. The control system of claim 1, wherein the selection module includes instructions to select the active controller including instructions to determine whether the driving context indicates that the vehicle is driving in one of an urban area and on a highway, and to select the ML controller when the driving context indicates the urban area.

3. The control system of claim 1, wherein the selection module includes instructions to select the active controller including instructions to determine whether the driving context indicates that the vehicle is driving on a highway with a road curvature that satisfies a curve threshold, and to select the ML controller when the driving context indicates the road curvature satisfies the curve threshold for a curvy road.

4. The control system of claim 1, wherein the selection module includes instructions to select the active controller including instructions to determine whether the driving context indicates that the vehicle is driving on a highway that is straight without a complex driving scenario for the use of a lane-keeping function, and to select the PID controller according to the driving context.

5. The control system of claim 1, wherein the PID controller is a control loop mechanism that processes the sensor data to generate controls, and the ML controller implements one or more machine learning algorithms that process the sensor data to generate the controls.

6. The control system of claim 1, wherein the selection module includes instructions to acquire the sensor data including instructions to use one or more sensors of the vehicle to generate observations about the surrounding environment from which the driving context can be derived.

7. The control system of claim 1, wherein the selection module includes instructions to control the vehicle using the active controller including instructions to generate control inputs including lateral controls and longitudinal controls to at least assist in control of the vehicle.

8. A non-transitory computer-readable medium storing instructions that, when executed by one or more processors, cause the one or more processors to:
in response to acquiring sensor data about a surrounding environment of a vehicle, determine a driving context of the vehicle in relation to aspects of a roadway on which the vehicle is traveling, wherein the driving context includes indicators about whether the vehicle is driving on a highway, in an urban area, on a road with a curvature that satisfies a curve threshold, and whether a lane keeping function of the vehicle is active;
select an active controller for generating control inputs to the vehicle according to the driving context by selecting between a proportional, integral, derivative (PID) controller and a machine learning (ML) controller,
wherein the instructions to select the active controller include instructions to determine whether the driving context indicates that the vehicle is driving on a highway and with a lane-keeping function active that satisfies a lane threshold, the lane threshold indicating whether two or more nearby vehicles are present and whether other assistance systems of the vehicle are not operating, and
wherein the instructions to select the ML controller include instructions to select the ML controller when the driving context indicates the lane-keeping function satisfies the lane threshold for a complex driving scenario; and
control the vehicle using the active controller.

9. The non-transitory computer-readable medium of claim 8, wherein the instructions to select the active controller include instructions to determine whether the driving context indicates that the vehicle is driving in one of an urban area and on a highway, and to select the ML controller when the driving context indicates the urban area.

10. The non-transitory computer-readable medium of claim 8, wherein the instructions to select the active controller include instructions to determine whether the driving context indicates that the vehicle is driving on a highway with a road curvature that satisfies a curve threshold, and to select the ML controller when the driving context indicates the road curvature satisfies the curve threshold for a curvy road.

11. A method, comprising:
in response to acquiring sensor data about a surrounding environment of a vehicle, determining a driving context of the vehicle in relation to aspects of a roadway on which the vehicle is traveling, wherein the driving context includes indicators about whether the vehicle is driving on a highway, in an urban area, on a road with a curvature that satisfies a curve threshold, and whether a lane keeping function of the vehicle is active;
selecting an active controller for generating control inputs to the vehicle according to the driving context by selecting between a proportional, integral, derivative (PID) controller and a machine learning (ML) controller,
wherein selecting the active controller includes determining whether the driving context indicates that the vehicle is driving on a highway and with a lane-keeping function active that satisfies a lane threshold, the lane threshold indicating whether two or more nearby vehicles are present and whether other assistance systems of the vehicle are not operating, and
wherein selecting the ML controller includes selecting the ML controller when the driving context indicates the lane-keeping function satisfies the lane threshold for a complex driving scenario; and
controlling the vehicle using the active controller.

12. The method of claim 11, wherein selecting the active controller includes determining whether the driving context indicates that the vehicle is driving in one of an urban area and on a highway, and selecting the ML controller when the driving context indicates the urban area.

13. The method of claim 11, wherein selecting the active controller includes determining whether the driving context indicates that the vehicle is driving on a highway with a road curvature that satisfies a curve threshold, and selecting the ML controller when the driving context indicates the road curvature satisfies the curve threshold for a curvy road.

14. The method of claim 11, wherein selecting the active controller includes determining whether the driving context indicates that the vehicle is driving on a highway that is straight without a complex driving scenario for the use of a lane-keeping function, and selecting the PID controller according to the driving context.

15. The method of claim 11, wherein the PID controller is a control loop mechanism that processes the sensor data to generate controls, and the ML controller implements one or more machine learning algorithms that process the sensor data to generate the controls.

16. The method of claim 11, wherein acquiring the sensor data includes using one or more sensors of the vehicle to generate observations about the surrounding environment from which the driving context can be derived.

17. The method of claim 11, wherein controlling the vehicle using the active controller includes generating control inputs including lateral controls and longitudinal controls to at least assist in control of the vehicle.

* * * * *